United States Patent [19]
Green et al.

[11] Patent Number: 5,969,704
[45] Date of Patent: Oct. 19, 1999

[54] CONFIGURABLE LED MATRIX DISPLAY

[75] Inventors: Anthony Edward Green, Las Vegas; Christy J. Olsen, Henderson, both of Nev.

[73] Assignee: Mikohn Gaming Corporation, Las Vegas, Nev.

[21] Appl. No.: 08/893,124

[22] Filed: Jul. 15, 1997

Related U.S. Application Data

[63] Continuation of application No. 07/577,436, Sep. 4, 1990, abandoned.

[51] Int. Cl.$^6$ .................................................... G09G 5/00
[52] U.S. Cl. .............................. 345/113; 345/82; 345/474
[58] Field of Search ................................ 345/82, 83, 122, 345/474; 364/705; 371/32; 273/237, 269; 705/26; 348/5; 358/342

[56] References Cited

U.S. PATENT DOCUMENTS

| | | | |
|---|---|---|---|
| 3,594,762 | 7/1971 | Gardberg et al. | 345/55 |
| 3,760,159 | 9/1973 | Davis et al. | 345/55 |
| 3,899,772 | 8/1975 | Mead et al. | 345/60 |
| 4,339,798 | 7/1982 | Hedges et al. | 364/412 |
| 4,485,463 | 11/1984 | Kita | 340/792 |
| 4,574,364 | 3/1986 | Tabuta et al. | 345/119 |
| 4,624,462 | 11/1986 | Itkis | 273/237 |
| 4,652,998 | 3/1987 | Koza et al. | 364/412 |
| 4,710,767 | 12/1987 | Sciacero et al. | 345/119 |
| 4,715,010 | 12/1987 | Inoue et al. | 364/705.06 |
| 4,750,034 | 6/1988 | Lem | 348/5 |
| 4,763,356 | 8/1988 | Day, Jr. et al. | 345/173 |
| 4,782,336 | 11/1988 | Bailey . | |
| 4,833,632 | 5/1989 | Nishimura et al. | 364/709.04 |
| 4,856,787 | 8/1989 | Itkis | 273/237 |
| 4,888,690 | 12/1989 | Huber | 395/100 |
| 4,961,158 | 10/1990 | Sussman | 364/710.04 |
| 4,970,502 | 11/1990 | Kunikane et al. | 345/56 |
| 4,973,952 | 11/1990 | Malec et al. . | |
| 4,992,940 | 2/1991 | Dworkin | 705/26 |
| 5,007,055 | 4/1991 | Isono et al. | 371/32 |
| 5,007,649 | 4/1991 | Richardson | 273/269 |
| 5,027,112 | 6/1991 | Ross et al. | 340/792 |
| 5,029,014 | 7/1991 | Lindstrom | 358/342 |
| 5,093,907 | 3/1992 | Hwong et al. | 395/152 |
| 5,165,012 | 11/1992 | Crandall et al. | 395/100 |
| 5,198,803 | 3/1993 | Shie et al. . | |
| 5,214,758 | 5/1993 | Ohba et al. . | |
| 5,222,209 | 6/1993 | Murata et al. . | |

*Primary Examiner*—Steven J. Saras
*Assistant Examiner*—Paul A. Bell
*Attorney, Agent, or Firm*—Dorr, Carson, Sloan & Birney, P.C.

[57] ABSTRACT

A LED matrix display having a variety of enhanced functionalities including: a scheduler which schedules tasks based upon commands correlated with real time; a tracking and accounting procedure which provides a database file which accounts for tasks as a function of the time a task is performed; sports display presentations of various sports information associated with different sports based upon corresponding sports IDs; the use of virtual display images or windows which may vary over time and which overlay template or faceplate images; and an improved error reporting capability in which detected errors are displayed using clear descriptive text information.

10 Claims, 4 Drawing Sheets

| RECORD NAME | TASK DURATION | TIME PERIOD 1, T1 |||| TIME PERIOD 2, T2 ||||
|---|---|---|---|---|---|---|---|---|---|
| | | ATTEMPT | COMPLETE | DT1 | DT2 | DT3 | ATTEMPT | COMPLETE | DT1 | DT2 | DT3 |
| RECORD 0 | | | | | | | | | | | |
| RECORD 1 | | | | | | | | | | | |
| RECORD 2 | | | | | | | | | | | |
| RECORD 3 | | | | | | | | | | | |
| .... | | | | | | | | | | | |
| RECORD 99 | | | | | | | | | | | |

| TIME PERIOD 3, T3 |||| TIME PERIOD 4, T4 ||||
|---|---|---|---|---|---|---|---|
| ATTEMPT | COMPLETE | DT1 | DT2 | DT3 | ATTEMPT | COMPLETE | DT1 | DT2 | DT3 |

Fig. 7

| | | | | | STATISTICS | |
|---|---|---|---|---|---|---|
| OUTS | 2 | | | | SINGLES | 17 |
| BALLS | 1 | | | | DOUBLES | 6 |
| STRIKES | 2 | | | | TRIPLES | 3 |
| | | | | | HOME RUNS | 14 |
| AT BAT | JOE BIGBAT | | | | E.R.A. | N/A |
| POSITION | THIRD BASE | | | | STRIKEOUTS | 58 |
| AVERAGE | .327 | | | | WALKS | 7 |

| | INNING | | | | | | | | | | | |
|---|---|---|---|---|---|---|---|---|---|---|---|---|
| TEAM | 1 | 2 | 3 | 4 | 5 | 6 | 7 | 8 | 9 | RUNS | HITS | ERRORS |
| METS | 0 | 0 | 0 | 0 | 1 | 2 | | | | 3 | 10 | 4 |
| YANKEES | 1 | 0 | 0 | 1 | 0 | | | | | 2 | 6 | 1 |

SPORTS CONTROL CONSOLE

Fig. 8

| TEAM | QUARTER | | | | SCORE |
|---|---|---|---|---|---|
| | 1 | 2 | 3 | 4 | |
| JETS | 7 | 0 | 0 | | 7 |
| GIANTS | 10 | 3 | 13 | | 26 |

| TIME OUTS | |
|---|---|
| JETS | 2 |
| GIANTS | 1 |

| TIME REMAINING | 8:32 |
|---|---|
| QUARTER | 3RD |
| DOWN | 3RD |
| YARD TO GO | 7 |

SPORTS CONTROL CONSOLE

CONFIGURABLE LED MATRIX DISPLAY

This application is a continuation of application Ser. No. 07/577,436 filed on Sep. 4, 1990, now abandoned.

BACKGROUND OF THE INVENTION

1. Field of the Invention

This invention relates to a method and apparatus for the generation of image sequences responsive to the contents of a time schedule file and, in particular, where the time schedule file determines the sequence, duration and initiation time for the generation of the image sequences.

The present invention further relates to a method and apparatus for displaying, on an LED matrix display, a selected one of many template images responsive to the message content of a communications packet received. Furthermore, the present invention relates to a method and apparatus for configuring a single LED matrix display to have a plurality of virtual displays. The present invention further relates to a method and apparatus for configuring the LED matrix display as regards the template image to be displayed, the number of virtual displays, the size and location of the individual virtual displays, and the message file to be used within each individual virtual display, such configuring of the LED matrix display being responsive to the contents of a configuration file.

The present invention still further relates to a method and apparatus for providing billing information in response to: the date, time of day, the repetitiveness and the duration of image sequences displayed.

Furthermore, the present invention relates to a method and apparatus for displaying, on the LED matrix display, descriptive error messages responsive to varied operating conditions.

2. Description of Prior Art

LED matrix displays have traditionally been used as a message display for various applications such as a marquee for special attractions, time and date, news events, sports events, etc. and is often used to advertise products or services to the general public or a particular market. Generally such products or services are advertised by simple text messages or complex animation sequences which describe the benefits of the products/services and in many cases is a visual message on a specialized display configured only for that purpose.

An LED matrix display, for displaying sophisticated imagery is described in U.S. patent application Ser. No. 451,976, entitled "METHOD AND APPARATUS FOR USE WITH MATRIX DISPLAY PANELS" and is commonly assigned to the assignee of the present application.

In the prior art, the LED matrix sequentially displays image sequences (text and/or animation) in a predetermined order. Therefore, for example, multiple advertisement messages could be sequentially displayed until the last message is displayed at which time the sequence repeats. However, the above described sequencing is not sufficiently flexible to meet many desired applications. In some instances, it is desired to display particular messages only on certain days and/or only during certain times of the day. For example, a message for a lunch special at a restaurant might need to be displayed from 11 AM through 2 PM on Monday through Friday.

To accomplish the above task the prior art matrix displays required that an operator intervene to change the sequence of the messages at 11 AM to include the lunch special message, and again at 2 PM to exclude the same. As a result such desired applications are often avoided due to the required burdensome operator intervention.

Clients often pay to have advertising messages displayed on the LED matrix displays. As in other forms of media, such as radio and TV, it is desired to track and account for the messages displayed as a function of the message's repetitiveness, duration, the time of day in which the message is displayed, and whether any attempted messages were aborted. However, in the prior art matrix displays, such tracking and accounting can not be accomplished automatically since the cyclical sequencing of the messages is not synchronized with the time of day. Furthermore due to the inability to automatically track and account for messages as a function of the time of day, bills can not be generated wherein varied billing rates are applied to messages as a function of the time period displayed (such as prime-time or drive-time billing methods used by many advertising agencies.)

Prior art LED matrix displays, such as game football and baseball score boards, are generally limited to a single sports application. Prior art LED matrix displays use a pre-generated sequence of frames to show images and/or animations. However, using such a method is not cost effective for a sports display because the images cannot be pre-generated while allowing for all possible combinations of the scores and statistics. Therefore, sports score boards generally contain fixed headers (a template) for defining information such as, in the case of baseball, runs per inning, the total number of hits, and the total number of errors. The variable information is provided, by an operator, to the score board as the information is obtained.

Another disadvantage of the prior art LED matrix displays is the inability to segment the display area into various independent virtual display areas. Therefore, for applications that typically require more than one display, such as a gaming progressive jackpot application, multiple independent displays were provided. However, with the variety of game and/or jackpot types available, the number of individual displays and associated faceplates quickly increases. Design and maintenance cost for multiple independent displays and associated faceplates is significantly higher than for a single display unit.

Prior art LED matrix displays suffer from a very crude method of displaying error messages. Upon detection of an error, an encoded message was displayed. A conversion chart provided to the service personnel permitted conversion of the encoded message into a useful descriptive message. However, in real life situations, the conversion chart is often not readily available and therefore, the messages often ignored, or service attempted without the benefit of the error message.

As can be appreciated, in the prior art, when using the displays for a dedicated purpose, or a separate display for each application, it was fairly easy to visually determine whether or not the display was properly operating. However, as the displays are becoming capable of showing many different displays at the same time, it is increasingly difficult to visually determine the existence of a failure condition. Therefore, there is a need for a method of displaying very precisely what error has occurred, and further, for putting such error descriptions into a file that can be retrieved at a later time by service personnel.

It is therefore an object of the present invention to provide an LED matrix display which provides improved capabilities for scheduling message tasks.

It is a further object of the present invention to provide an LED matrix display which provides comprehensive tracking and accounting of the message tasks displayed.

It is a still further object of the present invention to provide an LED matrix display which can be configured to be used as a score board for various sporting events, the display presenting a selected template as a function of the selected sport.

It is yet a further object of the present invention to provide an LED matrix display which can be configured to have more than one virtual display area.

It is still a further object of the present invention to provide an LED matrix display which displays descriptive error messages and produces a file containing the same.

SUMMARY OF THE INVENTION

In accordance with the principles of the present invention, the above and other objectives are realized in an LED matrix display provided with a scheduler which enables tasks to be scheduled and performed based upon commands correlated with real time. Various types of commands are used and provision is made to abort a task in progress to ensure that certain tasks are performed at scheduled times and provision is also made to synchronize the scheduler with real time.

The matrix display is also adapted to provide tracking and accounting of tasks that are performed. A tracking and accounting database file is developed which accounts for tasks as a function of the time of day a task is performed. Only tasks provided with a record number are recorded and tracked in the file. The file is segmented into time fields associated with different time periods which can be determined by the user and allocated to different accounting rates. The file further accumulates over time, for each time field and task, the number of attempts at the task, the number of completions of the task and the times and dates of the three most recent attempts at the task.

The display of the invention is also configured to provide presentation of sports information (e.g., scoreboards) for multiple sporting events by associating the sports information of different sports with different sports IDs. A template for a particular sport can then be accessed by addressing the display with the sports ID associated with the sport. Likewise, as the sporting event progresses, changing statistic information in the template can be supplied using the associated sports ID.

The matrix display of the invention is further adapted to overlay, over template or faceplate images, one or more virtual displays or windows whose images may change over time. A configuration file for the matrix display is used for this purpose and contains the necessary information for the template image as well as the necessary information for the virtual displays including those which are active and will change with time. Information for the active windows is accumulated for each frame and a multiplexing procedure is used for changing the displays of the active window, with the multiplexing rate being based upon the number of active windows.

An improved error handling and error reporting capability is also provided in the display of invention in which checking of the display circuitry is conducted at power up, during use and anytime files are loaded into the display. Any detected errors are displayed so as to be easily understood by using clear descriptive text as opposed to coded information.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
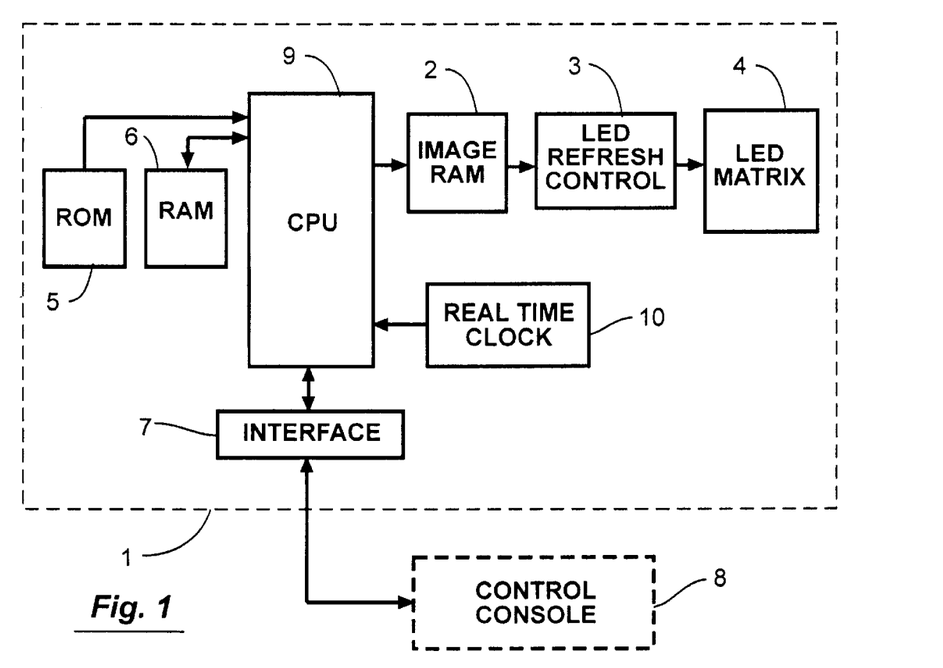
FIG. 1 shows an LED matrix display in accordance with the principles of the present invention.

In FIG. 1, a block diagram is shown for an LED matrix display 1. An LED matrix 4 is connected to an LED refresh control unit 3 which in turn connects to an image RAM 2. A CPU controller 9 connects to a CPU RAM 6, a CPU ROM 5, an image RAM or memory 2 and an external interface 7 for connection to an external control console 8. The CPU 9 is connected to a real time clock 10 which provides time and day information. Graphic images are formed by the CPU 9 and placed in the image RAM 2. The LED refresh control 3 converts the image stored in the image RAM 2 into appropriate signals for driving the LED matrix so as to display the image contained in the image RAM 2. The detailed operation of the LED refresh control 3 is discussed in prior filed, commonly owned U.S. patent application 451,976, which is herein incorporated by reference.

The CPU ROM 5 contains a set of instructions for running animated stories of the type which are created on a remote computer using a standard animation program such as Storyboard Plus. U.S. patent application 451,976 describes how such animated sequences are displayed on the LED matrix display and therefore, will not be discussed herein.

In accordance with the principles of the present invention, the CPU ROM 5 further contains programming steps for implementing a time scheduler task. The programming steps instruct the CPU 9 to read and interpret a scheduling file. The scheduling file is created by an operator and is subsequently stored in the CPU RAM 6. The scheduling file can be transmitted to the CPU RAM 6 using a variety of methods, for example, the scheduling file can be transferred in serial form through the interface 7 to the CPU 9 which in turn stores the scheduling file in CPU RAM 6. As a function of the content of the scheduling file, the CPU determines which tasks are to be displayed and at what time the tasks are to be displayed.

TABLE 1 list the three types of commands, and their associated functions, which can be contained in the schedule file for subsequent interpretation by the time scheduler routine.

TABLE 1

| COMMAND | FUNCTION |
| --- | --- |
| 1. TIME COMMAND | Specifies a task initiation time and includes the name of a task to execute at that time. |
| 2. TASK COMMAND | Links several tasks together sequentially. The task is an immediate execution task which runs immediately after the previous task. |
| 3. SYNCHRONIZE COMMAND | Synchronizes the command file with the current time. All time and task commands with a time earlier than the current time will be skipped in order to synchronize the first time command with a time equal to or greater than the current time. |

The commands in the schedule file are read by the scheduler task starting with the first command at the top of the list. If the command is a TIME COMMAND, the scheduler task waits for the current time (as read from the real time clock 10) to be greater than or equal to the task initiation time before executing the associated task. Upon executing the task the next command in the schedule file is processed. If a TASK COMMAND is encountered, the task is executed immediately and the next command is processed. If a SYNCHRONIZE COMMAND is encountered, the scheduler task resets to the top of the list of the schedule file and then sequentially examines each command until a TIME COMMAND is found that has a task initiation time that is equal to or greater than the current real time. The scheduler task then waits until the current time is greater than or equal to the task initiation time of the TASK COMMAND obtained and then initiates execution of that task.

In a schedule file each command is on a line terminated with a carriage-return and line-feed. The time entry within a TIME COMMAND is organized as follows:

@MMDDWhhmmss where subfields are defined as:
@=time setting flag
MM=month-of-year, 2 digits (00=null, 01=Jan. etc.)
DD=day-of-month, 2 digits (00=null)
W=day-of-week, 1 digit (0=null, 1=Sunday etc.)
hh=hour, 2 digit (24 hour format)
mm=minute, 2 digit
ss=second, 2 digit Any of the above entries may be excluded provided all other fields to the left are also excluded. For example, if 'hh' is excluded, then 'MMDDW' must also be excluded.

Figure 2:
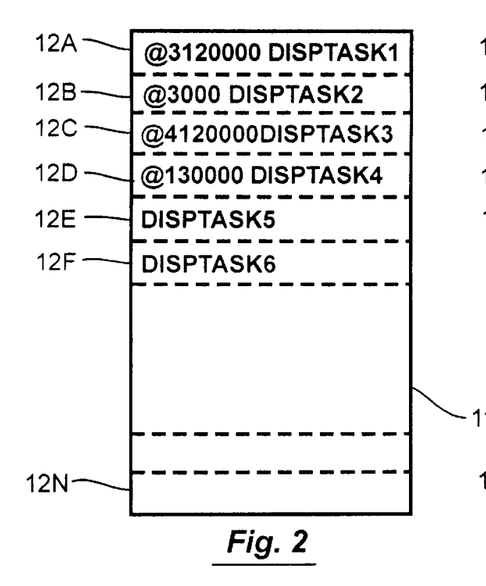
FIG. 2 shows a schedule file in accordance with the principles of the present invention and usable with the display of FIG. 1.

FIG. 2 is an illustrative schedule file 11 containing commands 12A–12N. Command line 12A has as the left most character a '@' indicating that the command is a TIME COMMAND. The task initiation time is parsed in reverse order (right to left) so that the time in command line 12A equals 00-seconds, 00-minutes, 12-hours, and 3-day. Expressed alternatively, the task initiation time indicated in command line 12A is Tuesday 12:00:00 pm. Command line 12B has as the left most digit a '@' indicating that the command is a TIME COMMAND. The task initiation time is parsed in reverse order (right to left) so that time in command line 12B equals 00-seconds and 30-minutes. Expressed alternatively, the task initiation time in command line 12B is calculated as 30:00 plus the base time of command 12A thereby equaling Tuesday 12:30:00 pm. By similar analysis, the time in command line 12C equals Wednesday 12:00:00 pm and the time in command line 12D equals Wednesday 13:00:00 pm. Neither command line 12E nor command line 12F contain as their left most character '@', therefore, command lines 12E and 12F are TASK COMMANDS. TASK COMMANDS do not contain a task initiation time and are therefore initiated immediately upon termination of the previous task.

The schedule file 11 of FIG. 2, generated by an operator, is subsequently transferred to the CPU RAM 6 where it is processed by the scheduler task. In response to command line 12A, the CPU 9 waits until Tuesday 12:00:00 pm at which time the CPU 9 initiates the task called DISPTASK1. In response to command line 12B, DISPTASK2 will be initiated at 12:30:00 of the same day, or upon termination of DISPTASK1, whichever is later. Therefore, if DISPTASK1 is longer than 30 minutes, the initiation of DISPTASK2 will be delayed. In response to command line 12C, upon termination of DISPTASK2, the CPU 9 waits until Wednesday 12:00:00 pm at which time DISPTASK3 is initiated. In response to command line 12D, DISPTASK4 will be initiated at 12:30:00 of the same day, or upon termination of DISPTASK3, whichever is later. Command lines 12E and 12F are TASK COMMANDS and therefore do not contain task initiation times. In response to command line 12E, the CPU 9 will initiate DISPTASK5 immediately upon termination of DISPTASK4. In response to command line 12F, the CPU 9 will initiate DISPTASK6 immediately upon termination of DISPTASK5.

Figure 3:
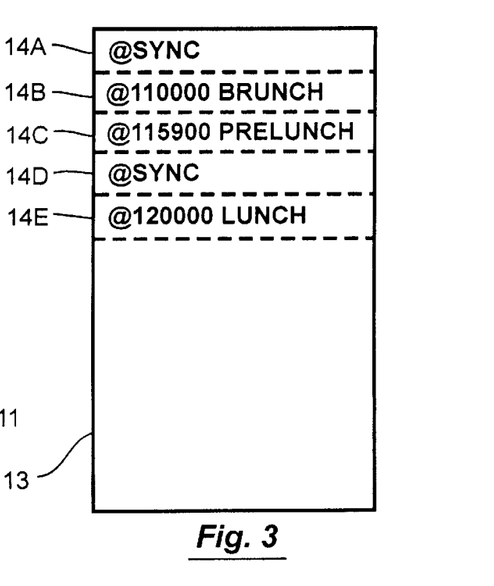
FIG. 3 shows a second schedule file in accordance with the principles of the present invention and usable with the display of FIG. 1.

FIG. 3 is another illustrative schedule file 13 containing commands 14A–14E. Schedule file 13 demonstrates the use of the synchronize (SYNC) command. The time scheduler is synchronized to initiate the BRUNCH display task at 11:00:00 (command lines 14A and 14B) and then at 11:59:00 initiates the PRELUNCH task (command line 14C) if the previous task has completed. Upon executing the PRELUNCH task, look ahead logic finds a SYNC command at command line 14D which in turn causes the time scheduler to reset and begin searching at command line 14A for a TIME COMMAND with a task initiation time greater or equal to the current time.

As can be appreciated, in the above example, the time scheduler logic finds a TIME COMMAND with a task initiation time of 12:00:00 at command line 14E, which is the first TIME COMMAND with a time that is greater or equal to the current time (at this point 11:59.) At 12:00:00 the time scheduler will abort any task in process and initiate the LUNCH task. On the assumption that the BRUNCH task is a fifteen minute task, it would have completed before 11:59, so the PRELUNCH task could begin executing at 11:59. On the assumption that the PRELUNCH is a five minute task, without the SYNC command, the LUNCH task could not have begun execution until 12:05. However, the SYNC command (command line 14D) causes the PRELUNCH tasks in progress to be aborted thereby permitting synchronized execution of the LUNCH task at the desired scheduled time (12:00).

While in the above examples, the schedule file was stored in CPU RAM 6, it is also possible to store the schedule file in CPU ROM 5. Furthermore, in the event that no valid task initiation time entry is found while reading a TIME COMMAND, a default task initiation time is set from the current time found in the real-time-clock. If a valid task entry is not found on a command line, the entire task string is ignored. However, a TIME COMMAND does not require a task entry. If no task entry is specified the scheduler task will only use the time portion. For example, the scheduler task will wait for the current time to be equal to the task initiation time setting from the command line before proceeding to the next line in the time schedule file. Still further, there is no limit to the number of entries in the time schedule file other than the available file storage area in the CPU RAM 6 (or CPU ROM 5).

The time scheduler task is further adapted in accordance with the principles of the present invention to detect changes in the schedule file and automatically implement a synchronize command, if needed. The synchronize command, in turn, results in the scheduler task being reset to the top of the schedule file and then sequentially examining each command until a TIME COMMAND is found that has a task initiation time that is equal to or greater than the current real time. The scheduler task then waits until the current time is greater than or equal to the task initiation time of the TASK COMMAND obtained and then initiates execution of that task. In this manner, each time the schedule file is changed, the scheduler task will execute the first TIME COMMAND having a task initiation time greater than the current real time. Still further, the scheduler task detects changes in both the static attributes and the reactive attributes of the schedule files and implements an automatic synchronize command in response to changes therein.

Attached appendix A made a part hereof contains flowcharts illustrating the logical steps performed in implementing the above described time scheduler. The flow charts are intended to be illustrative and are not intended to limit the present invention.

Figure 4:
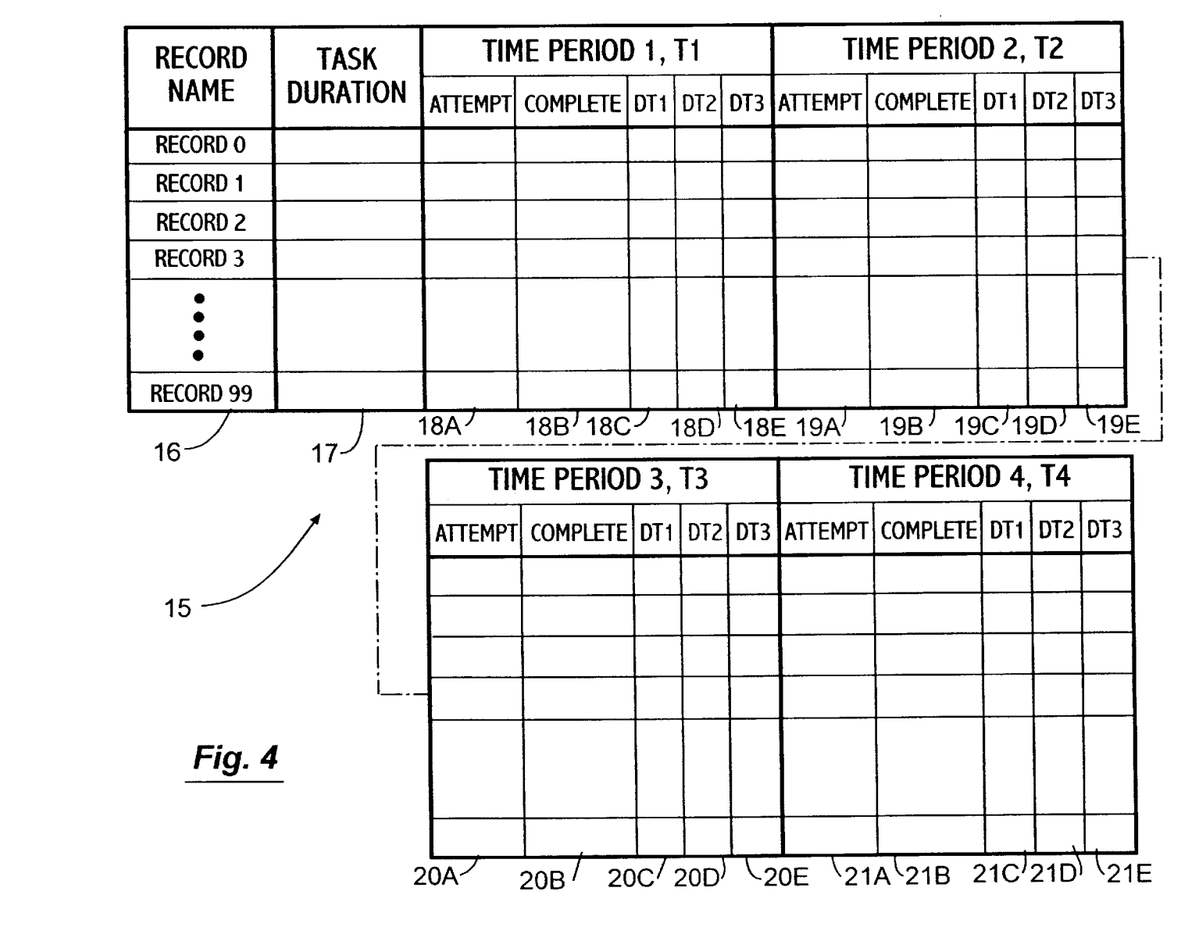
FIG. 4 shows a database file used for storing the results of a tracking and accounting task implemented by the display of FIG. 1.

Another aspect of the present invention is the ability of the display 1 to keep track and account for tasks that are displayed as a function of the time of day the task is displayed and the duration of the task. This permits the user to account for use of the matrix display 1. This is particularly important when displaying advertisements for clients who are paying for the advertisements on a time basis. Detailed bills may be generated from the results of the tracking and accounting capabilities. Tracking/accounting (T/A) task instructions are contained in the CPU ROM 5 (or CPU RAM 6) for instructing the CPU 9 to perform the T/A task. The T/A task forms a database in CPU RAM 6 which contains information concerning the tasks that were displayed. FIG. 4 shows an illustrative database file 15 (hereafter TRACK.ACT). The TRACK.ACT database file 15 is a matrix where each row represents a record number ranging from record 0 to record 99, each record corresponding to a display task (record 0 records system task time and records 1 to 99 record user task time). The columns represent various information regarding the execution of each record. The first column 16 contains a name to be associated with each record. The second column 17 stores the duration of the execution for each record. Columns 18A–18E, 19A–19E, 20A–20E and 21A–21E each contain a bank of entries or time fields associated with predefined Time Period 1, T1, through predetermined Time Period 4, T4, respectively.

Column 18A contains the number of display attempts during period T1. Column 18B contains the number of display completions during period T1. Columns 18C–18E contain the initiation date and time for the last three iterations of the display task within period T1. Columns 19A–19E, 20A–20E and 21A–21E are the same as columns 18A–18E described above, with the exception that they apply to predetermined time periods T2, T3 and T4, respectively.

Figure 5:
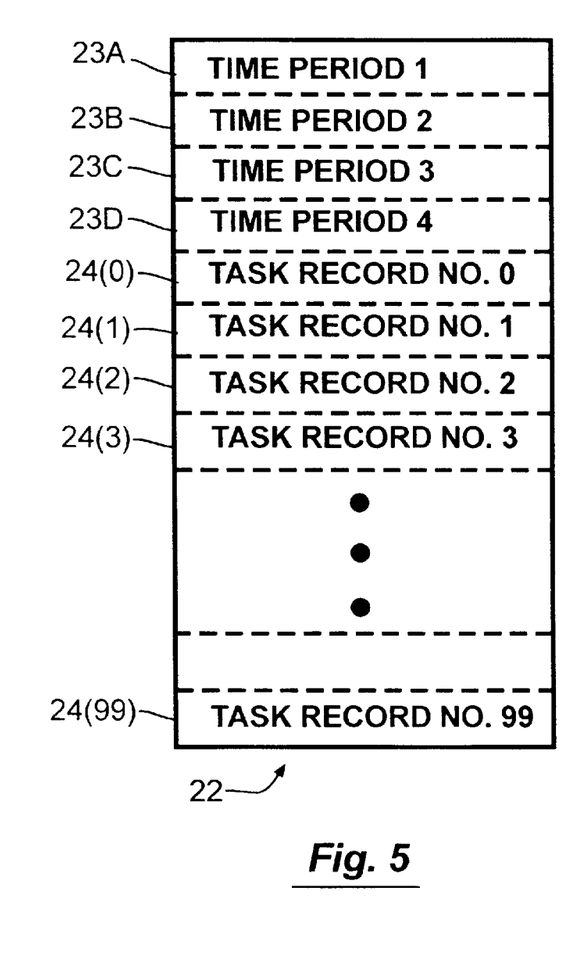
FIG. 5 shows a definition file used with the tracking and accounting task implemented by the display of FIG. 1.

Prior to running the T/A task, the operator must generate a T/A setup file (hereafter TRACK.ADF file). FIG. 5 shows a TRACK.ADF file 22 where the first four lines 23A–23D define time period T1–T4, respectively, Lines 24(0) through 24(99) contain the name of the task to be associated with record 0–99 of the database file 15, respectively. When the operator completes the generation of the TRACK.ADF file 22, the file is transferred to the CPU RAM 6.

Figure 6:
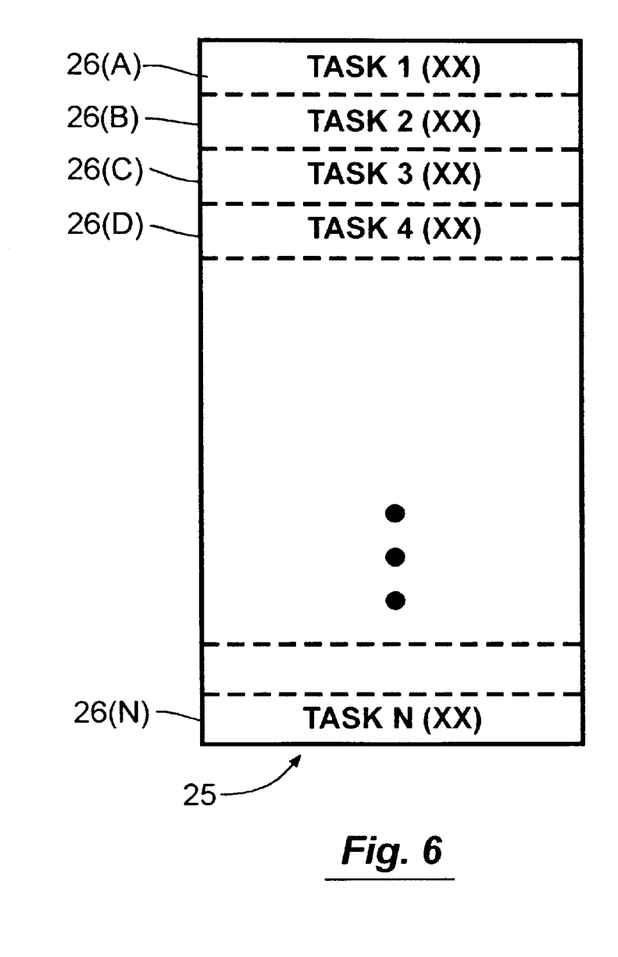
FIG. 6 shows a batch file for use with the tracking and accounting task implemented by the display of FIG. 1.

Also required to be generated by the operator prior to running the T/A task is a task management file (hereafter TASK.BAT). FIG. 6 shows a TASK.BAT 25 where lines 26(A)–26(N) contain a list of tasks to be run, some of which are to be tracked for billing purposes. To enable tracking of a task, a record number XX (where XX=1–99) is appended to the end of the task name. To disable tracking of a particular task, record number XX is left blank. The TASK-.BAT file 25 is a file that can be placed within the schedule file (FIG. 2) as discussed previously. The TASK.BAT file 25 can be initiated using a TIME COMMAND or a TASK COMMAND. Upon initiating the TASK.BAT file 25, each task listed in lines 26(A)–26(N) will sequentially be executed.

The operation of the T/A task will now be described. Each time the T/A task detects the initial loading, or a subsequent update of TRACK.ADF file 22 within the CPU RAM 6, the T/A task clears all the entries within the TRACK.ACT database 15. Thereafter, when the TASK.BAT file 25 is initiated by the scheduler task previously discussed, the T/A task reads lines 24(1)–24(99) of the TRACK.ADF file 22 and stores the name defined for each record in the first column 16 of the TRACK.ACT database 15. Furthermore, lines 23A–23D of the TRACK.ADF file 22 are read and time periods T1–T4 retained for further processing. The first task (line 26(A)) contained within the TASK.BAT file 25 is then executed. The real time clock 10 is compared against the stored time periods T1–T4 to determine which time period columns (18A–18E or 19A–19E or 20A–20E or 21A–21E) within the TRACK.ADF file 22 requires updating.

The following assumes that we are in Time Period 1, T1 and therefore, columns 18A–18E will be updated accordingly. It should be understood, however, that the following applies equally as well to updating the columns (19A–19E, 20A–20E and 21A–21E) when in the time periods T2–T4. Upon initiation of the first task, the record number associated with the task is used as an index into the TRACK.ACT database 15 and the appropriate attempt count column 18A is incremented. At the completion of the task, the record number is again used as an index into the TRACK.ACT database 15 and the completion count column 18B is incremented. The actual date and time that the task was initiated is stored in column 18$e$ after shifting the data previously stored in column 18E into column 18D and shifting the data previously stored in column 18D into column 18C. Therefore, columns 18E, 18D and 18C contain the three most recent initiation times for a given time period, respectively.

The duration of the task executed is calculated and is compared against the value stored in the duration column 17. If the numbers differ by greater than a given percent, assumed to be eight percent for discussion purposes, then the value in column 17 is updated to the present value. However, if the duration of the task just executed differs by less than eight percent, then the value in column 17 is not altered. The next task contained in the TASK.BAT file 25 is then executed and the above described sequence repeated.

As can be appreciated, the TRACK.ACT database 15 can be retrieved by an operator at periodic intervals and appropriate billing reports generated. For example, a bill may show that a particular advertisement ran thirty times a day with ten runs at premium rate four (i.e., time period T1), ten runs at premium rate three (i.e., time period T2), five runs at premium rate two (i.e., time period T3), and five runs at premium rate one (i.e., time period T4). Further, with the displays ability to present many different tasks, some which can cause interruptions of others, the user can also keep track of successful completions, the total time duration and be able to show three actual times a task was run for each time period. The TRACK.ACT database 15 can also be used to determine conflicts of different tasks where one task is interfering with another task and the operator can take corrective action to ensure a maximum billing situation.

It should be noted that time periods T1, T2, T3 and T4 are defined by the user of the display. Only one time period needs to be defined for the T/A function to operate. However, the use of multiple time periods permits different time periods to be used for premium time and non premium times and to be given different billing factors. Thus, for example, period T1 may be a premium time from 8:00 am until 5:00 pm and have a billing factor of 3, whereas time period T2 may be a non premium time from 5:00 pm until 8:00 am and have a billing factor of 0.5.

The following is a more specific example of the operation of the T/A task. Table 2 shows a TASK.BAT file 25. Table 3 shows a TRACK.ADF file 22. An operator is required to generate the two files.

TABLE 2

BREAKSPL.01
WARMUP.02
DAYSPL.03
EXERSHOW.04
FILLER1
FILLER2
LUNCHSPL.05
CRUISEAD.06
ONSALE.07
FILLER3
FILLER4
SPECIAL.08
SHOESALE.09
CRUISEAD.10

TABLE 3

T1: 06:00:00 08:59:59
T2: 09:00:00 12:59:59
T3: 13:00:00 17:59:59
01: BREAKSPL
02: WARMUP
03: DAYSPL
04: EXERSHOW
05: LUNCHSPL
06: CRUISEAD
07: ONSALE
08: SPECIAL
09: SHOESALE
10: CRUISEAD

The above two files (TASK.BAT and TRACK.ADF) define a list of fourteen tasks with ten that are trackable and one that is repeated and tracked separately for each execution. The database has three time periods defined, the time periods defined are trackable between the hours of 6:00 a.m. and 6:00 p.m.

These files are loaded by the operator into the CPU RAM 6. The display 1 is then cleared of any previous database entries 15 and a new one, retrievable by the user, is set up under the name TRACK.ACT. When the scheduler of the display 1 executes the file TASK.BAT (an interruptible event), this file will take over the display and begin execution of the first task BREAKSPL, which is an animated advertisement. The T/A function of the display then determines in which time period (T1, T2, T3 or T4) the task was initiated. Then, an attempt counter (for the determined time period), contained in database record number one, is incremented to indicate that this task was attempted. If the task is completed, a completion counter (for the determined time period) will be incremented and the date and time in which the task was initiated will be stored.

As TASK.BAT maintains control of the display 1 (no other interrupting events and it has not completed its list of tasks), the next task will be executed and so on until the end of the list when TASK.BAT gives control of the display 1 back to the master scheduler. While running through this list of tasks, WARMUP will be recorded in record area number two, and DAYSPL will be recorded in record area number three, and EXERSHOW will be recorded in record area number four, and LUNCHSPL will be recorded in record area number five, and then the first showing of CRUISEAD will be recorded in record area number six, while the second showing will be recorded in record area number ten. The other tasks will be recorded in their designated record areas, while the FILLER tasks will not be recorded as they did not have an appendage signifying that they were to be tracked.

As noted above the task "CRUISEAD" is run twice in one complete sequence with a separate tracking of each time it is executed. This is to provide maximum flexibility for the user, as to how to manage what is to be tracked. A task of the same name can appear a multitude of times within the same task list and can be tracked in the same record area or in separate areas as defined by the TASK.BAT file 25 and the TRACK.ADF file 22.

In summary, regarding the above example, some of the tasks are tracked, while others are not and in one case, the same task is executed twice within one sequence with separate recordings for each execution of the same task.

As above-noted, the file "TASK.BAT" is executed as a command called out in the time scheduler of the display and could be either a TIME COMMAND or a TASK COMMAND. In the above example, the file "TASK.BAT" might be executed twice an hour from 6:00 a.m. until 6:00 p.m. with each execution requiring approximately twenty minutes and other commands to be executed by the display scheduler. Alternatively, it may be desired that the file definition begin execution exactly at 6:00 a.m., 12:00 noon, and 4:00 p.m. This could be accomplished in the command file for the time scheduler by use of the SYNCHRONIZE COMMAND. Attached appendix B made part thereof contains flowcharts illustrating the logical steps performed in implementing the above-described T/A task. The flow charts are intended to be illustrative and are not intended to limit the present invention.

Figure 7:
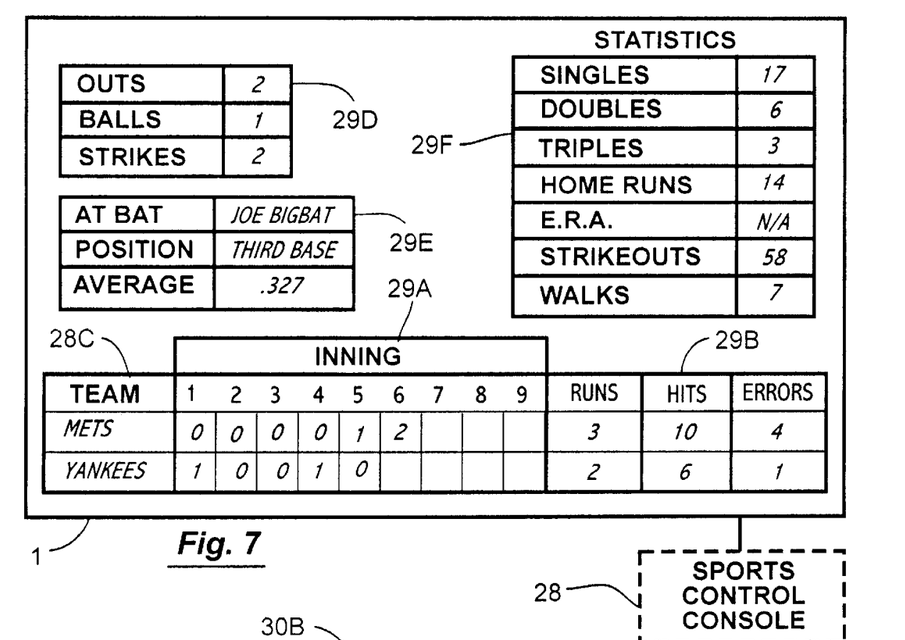
FIG. 7 shows the display of FIG. 1 configured as a baseball score board.
Figure 8:
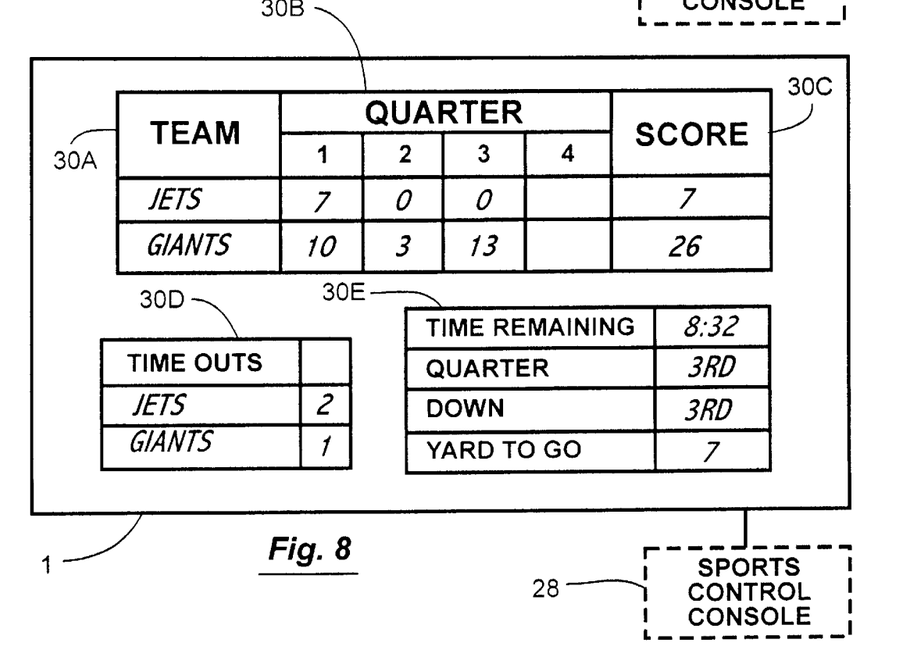
FIG. 8 shows the display of FIG. 1 configured as a football score board.

A further aspect of the present invention is to adapt the LED matrix display 1 so that it can be configured to be used to display sports information and, in particular, score boards for various sporting events. Each sporting event requires different information be displayed. For example, FIG. 7 and FIG. 8 illustrate the display 1 configured for use as baseball and football score boards, respectively.

Referring to FIG. 1, the LED matrix display 1 is connected to a sports control console 28 which permits an operator to initially select the desired configuration for the display 1 (i.e., baseball, football) using a sports ID associated with the specific sport. Further, during the game, the operator enters the game information into the selected display again using the sports ID. The console 28 transmits this information in packets which are received and processed by the display. The packets are received one byte at a time until the complete packet has been received. The display 1 processes each packet by putting it in a sports information buffer within the CPU RAM 6.

This sports information buffer is then examined by matrix display processing. First, the sports ID is checked for validity, then a checksum is compared with the information. If any of the validity tests fail, then the information in the sports information buffer is set to the sport type "NOSPORT" to signal an error. Assuming that the validity tests pass, the display processing calls an appropriate "sport driver module" according to the sports ID in the sports information buffer.

The individual sport driver modules have a predetermined layout or template, but the actual values displayed for various statistics of the sports, are filled in from the sport information buffer as provided by the operator during each game. The specific functions of the sports driver modules are:

1. Clear the entire matrix image
2. Generate the appropriate tables for the information, such as "GAME TIME" or TIME OUT" labels.
3. Generate the appropriate statistic information, such as the time remaining in the game or which team has called time out.
4. Send the completed image to the display memory.

Because only one sport module can be executed for each image generated, there is a guarantee that all sports buffer information is within context of its layout (determined from its sport ID).

FIG. 7 shows the display from the baseball driver module. The display comprises a baseball template which contains fixed information. Examples of fixed information for a baseball score board are shown as: the innings 29A, the runs/hits/errors 29B, the teams 29C, the outs/balls/strikes label 29D, the at bat/position/bat. average 29E, and the statistics label 29F. The display also contains variable data, such as the player at bat and the outs/balls/strikes which is extracted from the sports information buffer and displayed in appropriate positions on the display (the variable information is shown in italics.) During the course of a game, the template will remain constant and the variable data displayed will change in accordance with the information entered at the sports control console 28 and transmitted to the display 1.

FIG. 8 illustrates template and variable information for a football score board. As can be seen, the template information for a football score board is different than that required for the baseball score board. The template information is; the team 30A, the quarter 30B, the score 30C, the time-out display 30D, and other assorted information 30E. The variable data is shown in italics. As with the baseball scoreboard, during the course of the game, the template remains constant and the variable data changes in accordance with information entered at the sports control console 28.

As can be appreciated, the ability to configure the display 1 to function as a score board for a multiplicity of different sporting events is advantageous in that fewer different displays are required. Moreover, the display information for each sports template can be stored within the display, thereby minimizing the amount of information required to be transmitted from the sports control console 28 to the display 1.

Attached appendix C made part hereof contains flow-charts illustrating the logical steps performed in implementing the above-described sports score boards. The flow charts are intended to be illustrative and are not intended to limit the present invention.

Another aspect of the present invention is to further adapt the LED matrix display 1 to have multiple windows of display (virtual displays) used in conjunction with a template or faceplate image as discussed previously. This is accomplished by the operator providing a configuration file which contains information concerning the following: the template image to be displayed, the number of virtual displays or windows, the size and location of each virtual display or window, the type of information to be displayed in each virtual display, and a message file to be used with each virtual display or window.

The configuration data can be stored in a text file and read by the application that is invoked as a task, such as, for example, KENO (displays the results of a keno game). This requires that each time the application is invoked there is an associated configuration file available. Further, multiple configuration files can be available for a single application, with a different configuration file being used at different times.

The operation of the display 1 having virtual displays shall now be illustrated by describing the operation of a progressive jackpot gaming system application driver task (PRGSV). A progressive jackpot gaming system displays a background template and a plurality of dollar amounts. Each dollar amount is contained within a window display.

The logic of the PRGSV is shown in the flow charts in the attached Appendix D made part hereof and intended as illustrative and not limiting of the invention. More particularly, a routine PRGSV-PROG is provided to show that the main objective is to put an image on display 1, with a secondary objective of intializing or quitting the progressive application. An initialization routine (PRGSV-INIT) is executed each time the progressive application requires initialization. A quit routine (PRGSV-QUIT) is executed each time the progressive application must relinquish control of the display. A display routine (PRGSV-DISP) will generate a finished image as long as the progressive application is in control of the display.

In the PRGSV-INIT routine, if the program requires initialization, a progressive configuration file is read. A read definition (READ-DEF) routine processes the progressive configuration file one line at a time, determining which windows are to be active and what template image is to used. The template image is put into the image buffer where parts of the template image will be subsequently overwritten by windows containing progressive dollar amounts. A resize routine (RB-RESIZE) sets the window dimensions, the active jackpot group, and message file descriptor for each window.

After initialization, a READER module is called to generate all active windows. After the READER module has generated all active windows, the finished image is sent to the display. Requests to quit the progressive application are checked, and the program duration timer is checked for the expiration of the specified time. If either condition is true, then all windows are closed and the progressive application relinquishes control of the display. Otherwise, the progressive application returns to the system executive, fully expecting to be executed again for the next image frame.

The operation of the READER module shall now be described for a single window, however, the same logic is repeated for each defined window.

STEP 1. In a message checking module (MSG-CHK), progressive value messages are processed to obtain latest values for any progressive group which received a new value message. The progressive value tokens are updated at this time, so that values don't change between image generation for two different windows.

STEP 2. In an error scanning module (SCAN-ERRORS), error conditions are scanned. Errors such as communication time-outs, progressive value limit overflow, and loss of display address are checked. If an error signal exists, all windows are signaled.

STEP 3. If odometer values are being used, an odometer setup module (ODOM-SETUP) updates the odometer values. The odometer values are compared against maximum lag values, and the odometer roll speed updated accordingly. Note, that the odometer values or windows are redrawn or updated only when window 0 redraw flag is set. This is because the windows are redrawn using a multiplexing scheme and it is not desirable to change odometer values until the multiplex cycle is completed. Therefore, the odometer setup is skipped unless a multiplex cycle has been completed.

STEP 4. A counter for all windows, open or closed, is used to determine if a window is to be redrawn. The redraw process comprises erasing the image and building a new image to reflect such display features as flash, dazzling colors, and changed values.

STEP 5. If the window, which is pointed to by the window counter, is active and may be redrawn, a RBWNDW-REFRESH module executes to rebuild the window image.

STEP 6. If the window is active, a RB-MODE module is executed to calculate the relative coordinates of the window image to send to the template image. The calculations take the motion into account, that is, the coordinates are calculated for block, travel, up, or down motion.

STEP 7. If the window is active, a RB-UPDATE module is executed to send the window image to the template image.

STEP 8. Decrement the window counter and cycle through STEPS 4–6 until all windows have been processed.

STEP 9. The multiplex factor is set to the next multiplex stage, or set to begin a new cycle.

The READER module discussed above provides for multiplexing the re-drawing of the window images using a counter. Doing so reduces the overhead by preventing the redrawing of each window for every image frame. The extent of the overhead reduction is dependent upon the multiplex rate. For example, if the multiplex rate is set to two:one, then each window will be redrawn every other frame (i.e., every odd numbered window is redrawn on odd numbered frames and every even numbered window is redrawn on even numbered frames.)

The multiplexing of the windows does not affect the apparent performance of the motions used because the RB-MODE module is called every frame, thus allowing a one frame resolution of the motion commands. For example, the RB-MODE may move the image to the left for every frame during a travel motion, yet the image itself is only regenerated every other frame. The multiplex rate must be matched to the number of active windows or a loss of image granularity (i.e., flash or dazzling color timing) may result. The latter procedure is used, since the number of active windows is dynamic and can vary from time to time as specified by the progressive definition file.

When a window is redrawn a scanning is performed to detect local level errors. The local level errors apply only to the window currently being redrawn and none of the other windows are affected. A SCAN-STATUS module is initiated by the RBWNDW-REFRESH module to perform the error checking. The SCAN-STATUS module determines, by reading a variable labeled RB-STATUS, whether or not the current message should be aborted and a new message started in redrawing the next image for the current window. If the variable RB-STATUS contains an 'abort' value, then the current message is aborted and the new message is loaded. If the variable RB-STATUS contains a 'new' value, then the next paragraph of the same message file is loaded. If the RB-STATUS variable contains a 'ready' value, the same message paragraph is loaded so that it may continue to be displayed. Once the message is loaded, execution of a PARSE module will generate the combination of pixels which represent the content of the loaded message.

The PARSE module reads the loaded message and performs various processes according to control codes or text found in the message. This is where the odometer effect is performed. When an odometer control code is read from the message, the group specified after the odometer control code is used as a pointer to the odometer structure of the same group. The current message pointer is then transferred to the odometer token and odometer parameters are set from the odometer group structure. The odometer token is read as if it were any standard message, except when at the end of the odometer token, we do not stop (like a standard message), we set the message file pointer to the odometer next token (which usually contains a value one larger than the odometer token) and set the cursor location to where we started the odometer token. The odometer next token is then processed like any other message file, except at the end when the original message file is restored and parsing of the message continues. Because the values for the odometer are used by reference, they may be used in any combination with other odometer tokens or with multiple instances of the same odometer tokens.

The odometer structure contains parameters for: how many digits to skip before rolling a digit or symbol, how many punctuation symbols to skip before rolling, current vertical offset of rolling position, type of roll to use (none, all nines roll, and standard roll), token containing current odometer value, and token containing next odometer value. Since separate structures are kept for each group to odometer, it is possible to show all groups at once, odometering independently. There is no relationship between the odometering of independent windows.

Tokens which are not prefixed with an odometer control code are handled in a similar way except only one pass is made and no vertical offset is allowed. Visual features such as dazzling colors and flash are processed within the PARSE module, and therefore, are only affected when the image is redrawn. The status for dazzling colors and flash are recalculated when the PARSE module has finished redrawing the window image. The bounds of the image are determined in the JUSTIFY module which is initiated from the PARSE module. The JUSTIFY module calculates the left and right edges of the image according to the justification specified, or automatically left justifies for images that are too long for the window.

The RB-MODE module calculates the coordinates for the windows apparent motion. These coordinates encompass the part of the image which will affect the apparent motion. For instance, if the motion is travel, we may extract an area one column to the right from the last area to simulate traveling to the left. The RB-UPDATE module copies the finished window image to its final destination on the template image.

As previously noted, the above is repeated for all active windows. Before returning to the system executive, the combined template and windows are sent to the display RAM and the multiplex factor is adjusted for the next frame.

As can be appreciated, a display that provides for multiple windows within a single display can be used in a very large number of applications. While, in the above progressive gaming system described above, each window displays similar type information (i.e, jackpot amounts), varied other applications can be readily devised in accordance with the present invention. For example, the results of a keno game, the results of a bingo game, and the time of day, can all be concurrently displayed on a single display using the windowing techniques discussed above.

Another aspect of the present invention is to further adapt the LED matrix display 1 to have an improved error handling and error reporting capability. With the display 1 adapted to have the features discussed previously, the display increases in complexity. This additional complexity requires better error handling and reporting capabilities.

In accordance with this feature of the invention, the circuitry of the display 1 is checked upon power up, while the display is in use, and anytime that files are loaded into the display to insure integrity of the circuitry and the file content. Also, any error information detected is presented to the user or whoever is responsible for maintenance of the display in such a way as to help guide them to the problem quickly.

When errors are detected, an error handling module takes priority within the display 1 so as to be able to use the display for reporting and displaying error conditions. Error messages are displayed on the display and/or are placed into an error log file. If the display is operational to the point of permitting communications, then the error log file can be retrieved and reviewed by an operator for clues as to what action to take. This retrieval and review could be either local or remote. By having the remote capability, a determination can be made that could permit the problem to either be resolved remotely (such as retransmission of certain file information) or to know what action needs to be taken locally at the display.

The error message is provided in clear descriptive text rather than a cryptic message number. Error messages describe the error condition lucidly enough to permit the user to react appropriately without requiring assistance. As the error conditions are set out clearly, the information provided prevents the user from being confused by cryptic messages. As compared thereto, the prior art displays were limited to displaying a two digit error code message thereby requiring that the operator consult an operating manual to interpret the error message displayed. The windowing technique discussed earlier can be used to form a window on the display in which error messages are displayed. Furthermore, the window to display error messages can be inactive until an error message is required to be displayed. In this manner, the full area of the display may be used for a desired function during normal operation (i.e., no errors to display), and an error display window activated only upon detection of an error condition.

When the matrix display is powered up an error handling routine (ERRHANF1) within the operating system checks the CPU RAM 6 to detect memory allocation errors and calculates the checksum of each existing file to detect for any corrupted files. The internal structure of the memory control blocks are 21 bytes long and are located immediately before the memory area that they control. The operating system inspects the chain of the memory control blocks whenever a memory block allocation, modification or termination is performed. If any of the blocks are found to be corrupted or a broken chain is detected during the power-up cycle, the error handling routine (ERRHANF1) will create the error message and display it on matrix display. At the same time, the error code is written to the error log file with the date and time that the error was detected.

Illustrative of the types of error messages initiated by the ERRHANF1 module are as follows:

1. System RAM corrupted.

message: ERR1 SYSTEM RAM CORRUPTED
   STATUS: REINITIALIZED 2. Corrupted file detected (checksum does not match).

message: ERR2 CORRUPTED FILE: file name
   STATUS: DELETED 3. Corrupted block chain (block link list has been changed).

message: ERR3 CORRUPTED FILE: file name
   STATUS: DELETED A different problem can occur during file processing and file transmitting. When there is a problem, a second error handling module (ERRHANF2) reports the error code, the description of the error and the date and time in an error log file. For example, when the error code is set to 1, the message reflects that a file has failed to open. As a further example, when the error code is set to 14, the message reflects an invalid graphics mode. The error codes and error messages are shown below in TABLE 4:

TABLE 4

| Error Code | Description |
| --- | --- |
| 01 | File has failed to open |
| 02 | Not enough memory |
| 03 | Write to protected file |
| 04 | File not found |
| 05 | File already exists |
| 06 | Pointer passed the end of file |
| 07 | System file corrupted |
| 08 | Corrupted file (link list) |
| 09 | Corrupted file (checksum) |
| 10 | Missing blocks during the transmission |
| 11 | Invalid command during the transmission |
| 12 | File is already open |
| 13 | Delete read only file (try to delete file in ROM) |
| 14 | Invalid graphics mode |
| 15 | Invalid account record number |
| 16 | Invalid application |

To read an error log file generated, the file is transferred from the matrix display to an IBM-PC/PC compatible computer using a proprietary file transmission method (can be supplied with the matrix display.) After the file is transferred to an IBM-PC/PC compatible computer, a special program (report generator) can read the error log file and display the error messages on the screen or on a printer.

Attached appendix E contains flowcharts illustrating the logical steps performed in implementing the above described error detection and display modules. The flowcharts are intended to be illustrative and are not intended to limit the present invention.

It should also be noted that in Appendix A, the function MAINLOOP enables access to all of the above-discussed functions embodying the invention.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. An electronic matrix display adapted to sequentially execute multiple display tasks, each display task for displaying corresponding image sequences (text and/or animation) for a predetermined duration at predetermined times, the matrix display comprising:

means for determining real time;

a schedule file containing a number of time commands each of which has a task initiation time entry and a task entry that relates to initiation of a display task dependent on time;

means for automatically reading said schedule file;

means responsive to each said time command of the schedule file and to the means for determining real time for executing each said display task sequentially so as to effect the display of the corresponding image sequences in a display task for said predetermined duration at said predetermined time, wherein said means for executing each said display tasks delays execution of the task entry of the given time command until the real time is greater than or equal to the task initiation time entry of the given time command or the prior display task has completed execution, whichever is later;

said schedule file further comprises one or more synchronization commands;

responsive to each given synchronization command, said means for executing display tasks resets to the first command and sequentially searches the commands in said file until a time command is found having a task initiation time that is equal to or greater than the real time, said means for executing display tasks delaying execution of the time command found until the real time equals the task initiation time of the time command found;

means for detecting a change of the schedule file;

means for generating an automatic synchronization command responsive to said means for detecting a change;

responsive to said means for generating an automatic synchronization command, said means for executing display tasks resets to the first command and sequentially searches the commands in said file until a time command is found having a task initiation time that is equal to greater than the real time, said means for executing display tasks delaying execution of the time command found until the real time equals the task initiation time of the time command found;

said means for detecting a change in the schedule file further comprises: means for checking for the existence of said schedule file, means for checking the static attributes of said schedule file, and means for checking the archive attributes of the schedule file.

2. An electronic matrix display in accordance with claim 1 wherein:

each task initiation time entry comprises time subfields; and said means for executing display tasks interprets an unspecified time subfield in a given task initiation time entry as being equal to the corresponding time subfield in the task initiation time entry of the time command most recently executed.

3. An electronic matrix display in accordance with claim 2 wherein:

said time subfields range from a least significant subfield to a most significant subfield.

4. An electronic matrix display in accordance with claim 3 wherein:

said time subfields comprise one or more of: the month of the year, the day of the month, the day of the week, the hour of the day, the minute of the hour, and the second of the minute.

5. An electronic matrix display in accordance with claim 1 wherein:

each task initiation time entry comprises time subfields;

said real time comprises time subfields; and said means for executing display tasks interprets a blank time subfield in a given task initiation time entry as being equal to the corresponding time subfield of the real time.

6. An electronic matrix display in accordance with claim 1 wherein:

the schedule file is user generated.

7. An electronic matrix display adapted to be configured to display information associated with gaming events, the matrix display comprising:

means for storing one or more game templates each corresponding to game information generated by a different gaming event and each being identified by a different game ID;

means for receiving stored information in information packets associated with a gaming event, said information comprising a game ID number; and means for displaying the game template identified by the game ID in the received information wherein:

said means for receiving information comprises means for error checking;

said means for error checking comprises means detecting corrupted individual information packets received; and said means for receiving further comprises means for requesting a retransmission of individual information packets detected as being corrupted.

8. An electronic LED matrix display in accordance with claim 7 further comprising:

means for assembling a plurality of valid individual information packets into an information buffer;

and said error checking means comprises means for detecting checksum errors for the contents of said information buffer.

9. A method for an electronic matrix display adapted to sequentially execute multiple display tasks, each display task for displaying corresponding image sequences (text and/or animation) for a predetermined duration at predetermined times, the matrix display method comprising the steps of:

determining real time;

providing in a schedule file a number of time commands each of which has a task initiation time entry, and a task entry that relates to initiation of a display task dependent on time;

automatically reading said schedule file;

displaying the corresponding image sequences in a display task for the predetermined duration at the predetermined time;

detecting a change in the schedule file;

wherein the step of detecting a change in the schedule file further comprises the steps of:
  (a) checking for the existence of said schedule file;
  (b) checking the static attributes of said schedule file; and
  (c) checking the archive attributes of the schedule file;

generating an automatic synchronization command responsive to detecting a change;

responsive to generating an automatic synchronization command, resetting to the first time command and sequentially searching the time commands in said schedule file until a time command is found having a task initiation time that is equal to greater than the real time, said means for executing display tasks delaying execution of the time command found until the real time equals the task initiation time of the time command found;

delaying execution of the time command found in the sequential search until the real time equals the task initiation time of the time command found.

10. An electronic matrix display method adapted to be configured to display information associated with gaming events, the matrix display method comprising the steps of:

storing a plurality of game templates each corresponding to game information generated by a different gaming event and each being identified by a different game ID;

receiving the game information in information packets associated with a gaming event, said information including a game ID number;

detecting corrupted individual information packets in the received information;

requesting a retransmission of individual information packets detected as being corrupted; and displaying in the electronic matrix display (1) the game template identified by the game ID in the received information, and (2) the information generated by the game in the displayed template.

* * * * *